United States Patent
Oertley et al.

(10) Patent No.: US 8,333,528 B2
(45) Date of Patent: Dec. 18, 2012

(54) LATERAL PIN RETENTION SYSTEM AND METHOD

(75) Inventors: Thomas Oertley, Peoria, IL (US); Michael T. James, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 187 days.

(21) Appl. No.: 12/706,651

(22) Filed: Feb. 16, 2010

(65) Prior Publication Data

US 2011/0044752 A1 Feb. 24, 2011

Related U.S. Application Data

(60) Provisional application No. 61/152,842, filed on Feb. 16, 2009.

(51) Int. Cl.
*F16J 1/18* (2006.01)

(52) U.S. Cl. .................... 403/154; 403/150; 37/466

(58) Field of Classification Search .............. 403/150, 403/151, 154, 157, 161, 332, 328; 37/466, 37/468

See application file for complete search history.

(56) References Cited

U.S. PATENT DOCUMENTS

| | | | | |
|---|---|---|---|---|
| 1,057,648 A | * | 4/1913 | Lindhard | 188/319.2 |
| 1,772,187 A | * | 8/1930 | Manning | 403/28 |
| 3,401,964 A | * | 9/1968 | Johnson | 403/151 |
| 3,525,448 A | * | 8/1970 | Bauer | 414/715 |
| 3,554,588 A | | 1/1971 | Reinsma et al. | |
| 4,095,909 A | | 6/1978 | Mackoway | |
| 4,096,957 A | | 6/1978 | Iverson et al. | |
| 4,251,182 A | | 2/1981 | Schroeder | |
| 4,261,788 A | * | 4/1981 | McClung | 156/541 |
| 4,398,862 A | * | 8/1983 | Schroeder | 414/723 |
| 4,491,436 A | | 1/1985 | Easton | |
| 4,668,025 A | | 5/1987 | Macdonald | |
| 4,772,150 A | * | 9/1988 | Horton | 403/39 |
| 4,961,667 A | * | 10/1990 | Reinsma et al. | 403/11 |
| 5,044,812 A | | 9/1991 | Ardelt et al. | |
| 5,265,511 A | * | 11/1993 | Itzov | 83/490 |
| 5,630,673 A | | 5/1997 | Krzywanos et al. | |
| 5,769,557 A | | 6/1998 | Beals et al. | |
| 5,893,541 A | * | 4/1999 | Michaelson | 248/158 |
| 5,961,141 A | | 10/1999 | Goel | |
| 5,993,138 A | | 11/1999 | Anderson et al. | |
| 6,279,247 B1 | * | 8/2001 | Neitzel | 33/727 |
| 6,283,667 B1 | | 9/2001 | Neitzel | |
| 6,322,280 B1 | | 11/2001 | Coyne | |
| 6,382,742 B1 | | 5/2002 | Hasselbusch et al. | |
| 6,485,116 B1 | | 11/2002 | Oertley | |
| 7,309,186 B2 | | 12/2007 | Oertley | |
| 7,367,739 B2 | * | 5/2008 | Brock et al. | 403/39 |
| 2009/0110472 A1 | | 4/2009 | Liang et al. | |

* cited by examiner

*Primary Examiner* — Joshua Kennedy

(74) *Attorney, Agent, or Firm* — Finnegan, Henderson, Farabow, Garrett & Dunner, LLP

(57) ABSTRACT

A pin joint includes a pin having a longitudinal axis. A bushing for use with a lateral pin retention system may be positioned around the pin. The bushing includes an arc groove disposed radially about an outer surface of the bushing. A retaining plug for use with the lateral pin retention system includes an engagement head shaped to engage the arc groove and may be attachable to a linkage of a machine.

18 Claims, 5 Drawing Sheets

US 8,333,528 B2

LATERAL PIN RETENTION SYSTEM AND METHOD

CROSS-REFERENCED TO RELATED APPLICATIONS

This application claims benefit of U.S. Provisional Application No. 61/152,842 filed Feb. 16, 2010, which disclosure is incorporated herein.

TECHNICAL FIELD

This invention relates generally to pin joint assemblies and more particularly, to a lateral pin retention system.

BACKGROUND

Pin joints are used in a number of applications to rotatably connect two portions of a machine together, for example, pin joints may be used to rotatably connect each structure of a linkage. For example in U.S. Pat. No. 7,309,186, a pin joint may include a bushing, sleeve bearings, inserts, collars, seals and other components disposed about a central pin. The pin joint is then retained in position by retainers disposed on one or more ends of the pin joint. However, during use, the components of the pin assembly may shift out of alignment, which may accelerate wear and failure of the pin joint. For example, the bushing may receive a side load causing the bushing to be biased against a first seal and away from the second seal. This biasing of the bushing over time may cause the seal to prematurely fail and leak lubricant from the pin joint, thus leading to premature failure of the pin joint

SUMMARY OF THE INVENTION

In one aspect, a pin joint comprises a pin having a longitudinal axis. A bushing for use with a lateral pin retention system may be positioned around the pin. The bushing includes an arc groove disposed radially about an outer surface of the bushing.

In another aspect, a retaining plug for use with the lateral pin retention system includes an engagement head shaped to engage the arc groove.

In yet another aspect, a cap assembly of the retaining plug is configured to attach to a linkage of a machine.

In an aspect of the method for maintaining a position of a bushing on a pin in a pin joint, the method includes positioning a bushing around the pin. The bushing includes an arc groove disposed radially about an outer surface of the bushing. The method further includes positioning an engagement head of a retaining plug in the arc groove.

In a further aspect of the method, the method includes attaching a cap assembly of the retaining plug to a linkage of a machine.

DETAILED DESCRIPTION

Figure 1:
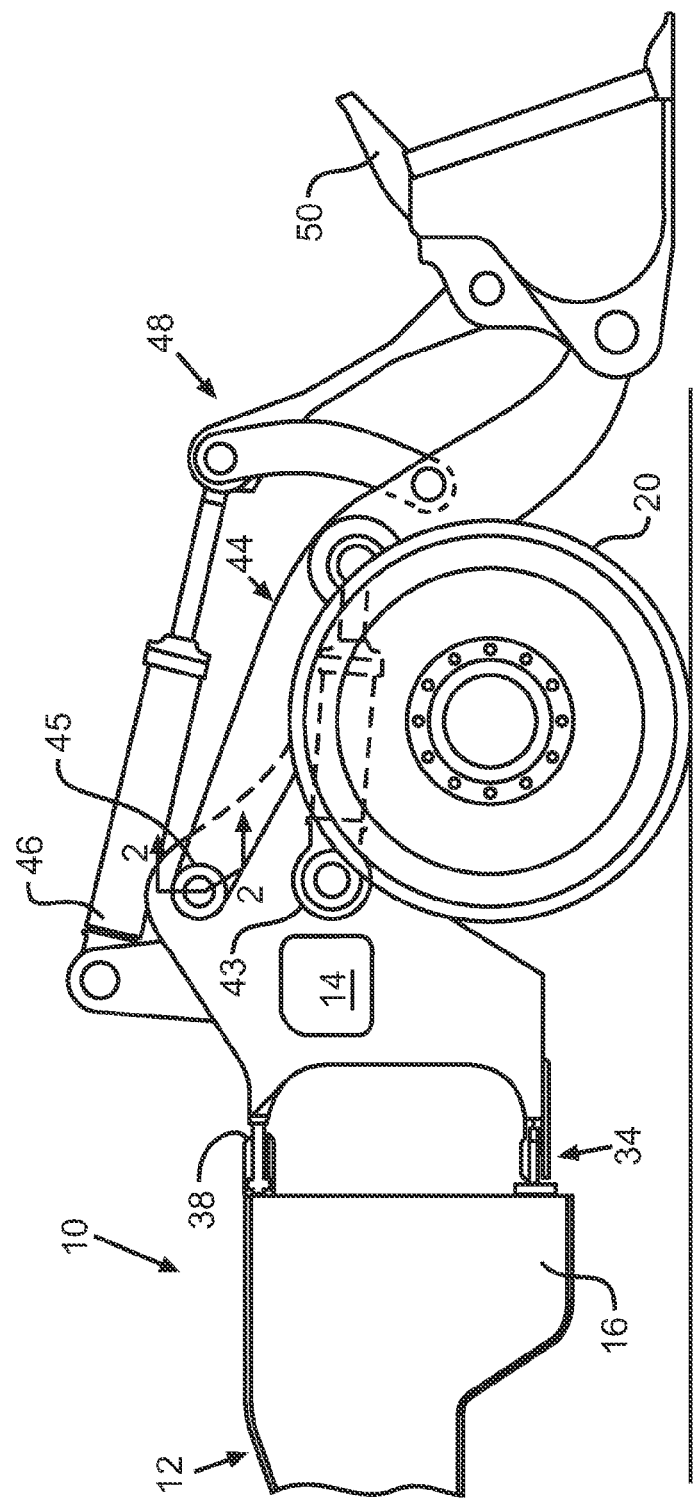
FIG. 1 is a side view of a machine featuring a linkage incorporating pin joints.

Referring to FIG. 1, an elevated side view illustrates a machine 10. The machine 10 may be a wheel loader, back hoe loader, or any other machine including a linkage, such as excavators and the like that may utilize the components described herein. As shown, machine 10 may have a structural frame 12 with a front portion 14 and a rear portion 16. A plurality of ground supporting members 20, such as tires, wheels, or tracks, are connected to the front portion 14, one of which is shown, and the rear portion 16 of the structural frame 12 through axles, drive shafts or other means (not shown).

An articulated joint 34 pivotally connects the front portion 14 to the rear portion 16 by way of a pair of pin joints 38. A linkage 44 is pivotally connected to the front portion 14 of the frame 12 by a pin joint 45, with a lift cylinder 43 pivotally connected between the front portion 14 of the frame 12 and the linkage 44. A tilt cylinder 46 is connected between the front portion 14 and a tilt assembly 48 of the linkage 44. The linkage 44, the lift cylinder 43, and the tilt cylinder 46 may be connected by pin joints and provide the means to raise, lower and orient an implement 50, such as a bucket, forks, and other implements known in the art.

Figure 2:
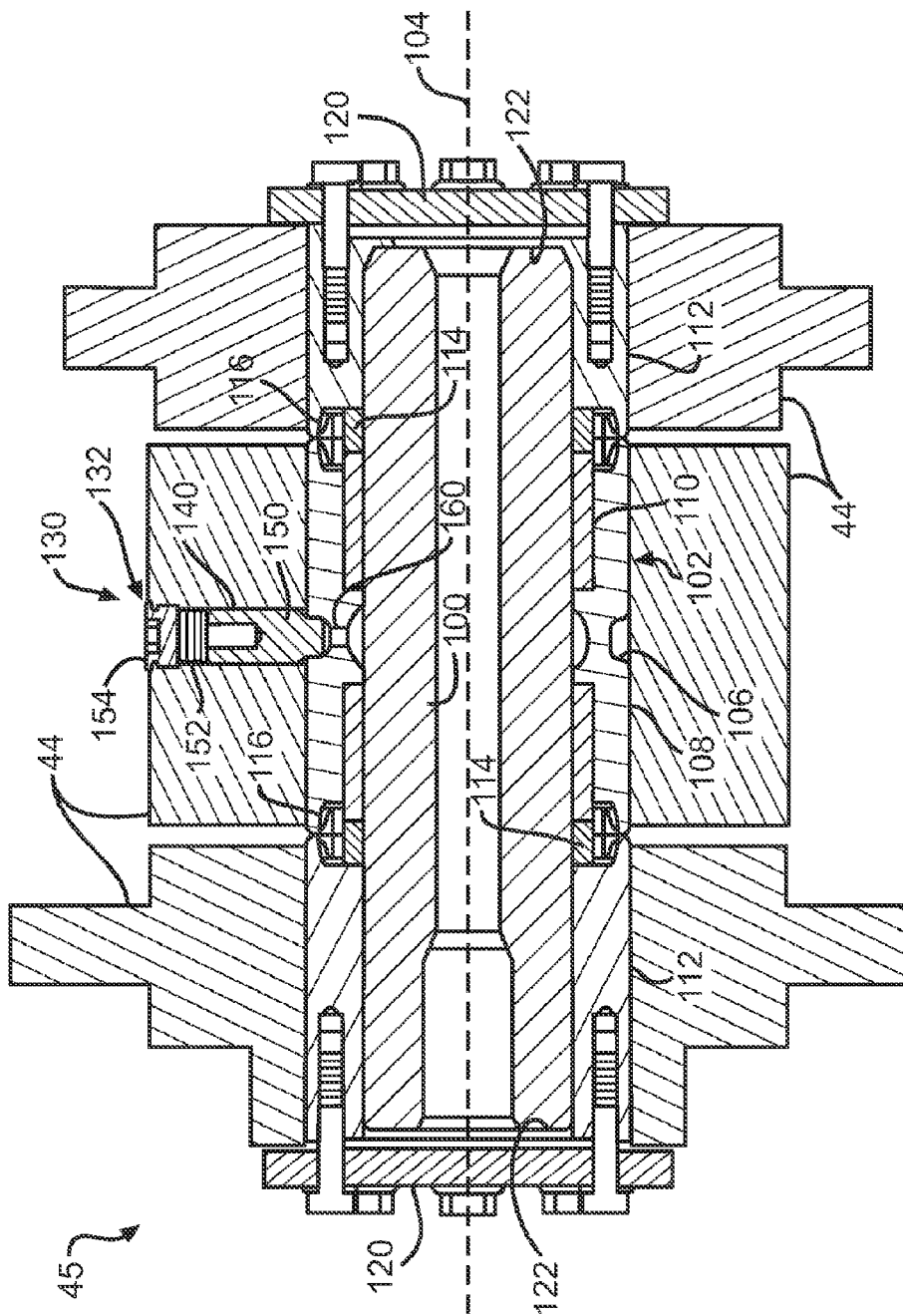
FIG. 2 is a cross section taken along line 2-2 of FIG. 1 illustrates one of the pin joints of FIG. 1.

Referring to FIG. 2, a cross section taken along line 2-2 of FIG. 1 that illustrates the pin joint 45 which may be representative of all of the pin joints in the linkage 44. As shown, the pin joint 45 includes a pin 100 and a bushing 102 rotatably positioned on the pin 100. The pin 100 and bushing 102 are disposed about a longitudinal axis 104. The bushing 102 includes an arc groove 106 that is radially disposed relative to the longitudinal axis 104 on an outer surface 108 of the bushing 102.

The pin joint 45 may optionally include one or more sleeve bearings 110, inserts (not shown), collars 112, thrust rings 114, and seals 116. The collars 112 may be attached to the pin 100 so that during operation of the pin joint 45, the bushing 102 rotates relative to the collars 112 and the pin 100. The thrust rings 114 may be used to better distribute axial or side loads applied to the pin joint 45.

The seals 116 may be disposed between the components surrounding the pin to retain a lubricant in the pin joint 45. The seals 116 may be any suitable type of seal such as a metal-to-metal face seals or can seals.

The pin joint 45 may be retained in the linkage 44 by one or more retainers 120 disposed on one or more ends 122 of the pin joint 45. The one or more retainers 120 may be any suitable retention system known in the art such as the illustrated bolted faceplate.

As shown, the pin joint 45 further includes a lateral pin retention system 130. The lateral pin retention system 130 includes a retaining plug 132 shaped to engage the arc groove 106 in the outer surface 108 of the bushing 102. During articulation of the linkage 44, the retaining plug 132 moves about the arc groove 106 providing continuous engagement between the retaining plug 132 and the bushing 102, thus providing positive retention and positioning of the bushing 102 relative to the pin 100.

When installed on a machine 10, the retaining plug 132 is disposed within a hole 140 in the linkage 44 coupling so that the retaining plug 132 may be held against the bushing 102 and in the arc groove 106. More specifically, retaining plug 132 may include an engagement head 150, a biasing member 152, and a cap assembly 154. Further, a fastener (not shown) may be used to attach the engagement head 150, a biasing member 152, and a cap assembly 154 together as a single assembly. Alternatively, the retaining plug 132 may be a solid unitary structure.

Figure 3:
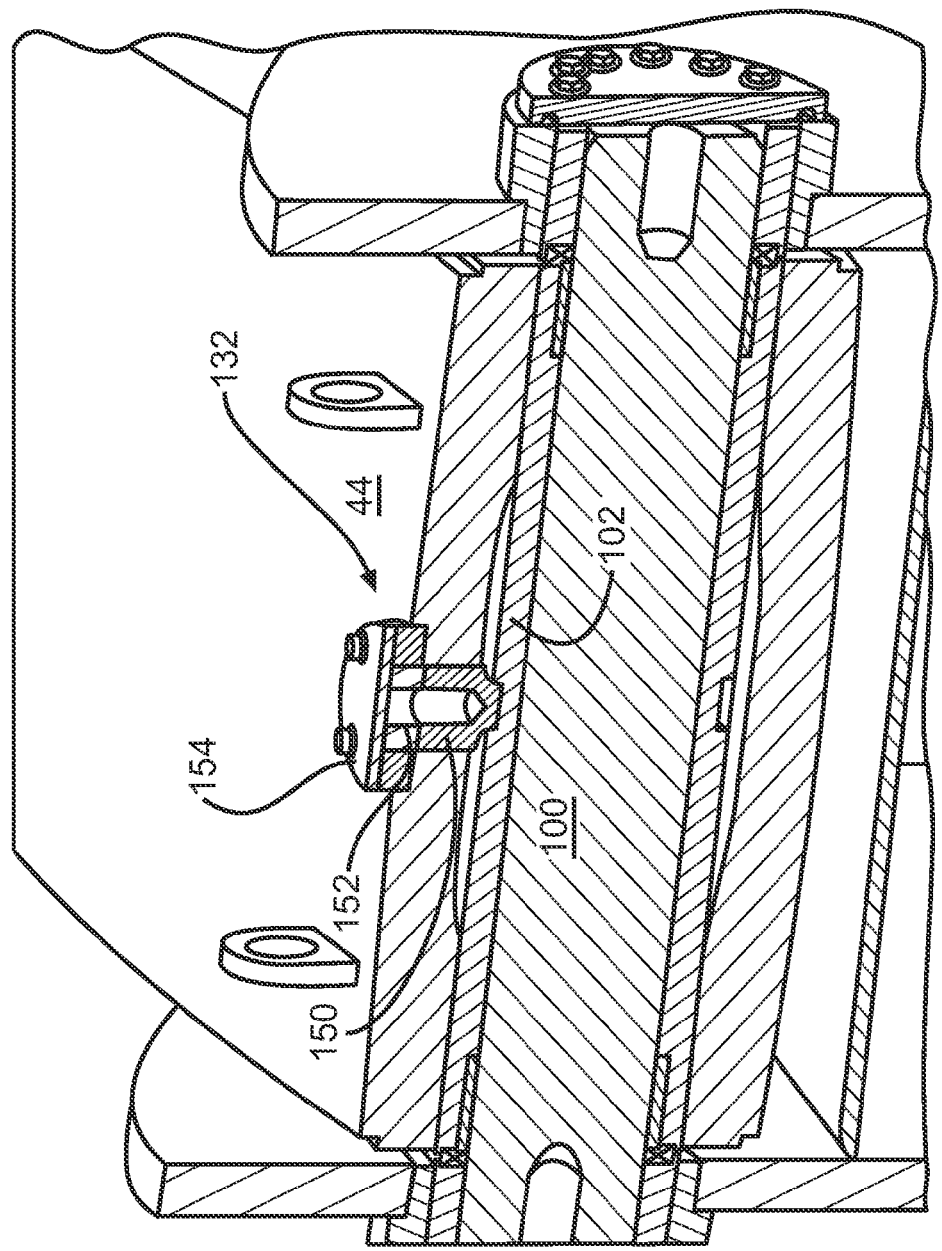
FIG. 3 is a perspective view of a cut away of the linkage of FIG. 1 showing the lateral pin retention system in engagement with the bushing of the pin joint.

The engagement head 150 is shaped to ride within and engage the arc groove 106 to maintain the spacing between the bushing 102 and the other components of the pin joint 45. The biasing member 152 may be a spring or resilient material or washer to help maintain the retaining plug in the arc groove 106. The cap assembly 154 may be threaded for threaded attachment to the hole 140 and maintains the engagement head 150 and the biasing member 152 in position in the hole 140. Alternatively, the cap assembly 154 may be bolted to the linkage 44 as shown in FIG. 3.

Still in reference to FIG. 2, a lubricant refill plug 160 may optionally be disposed within the arc groove 106. The lubricant refill plug 160 permits lubricant to be refilled within the pin joint 45 through temporary removal of the retaining plug 132 when the lubricant refill plug 160 is aligned with the hole 140. The lubricant refill plug 160 may be a zerc or removable fastener such as a screw, plug, cork, or any other sealing means known in the art.

Figure 4:
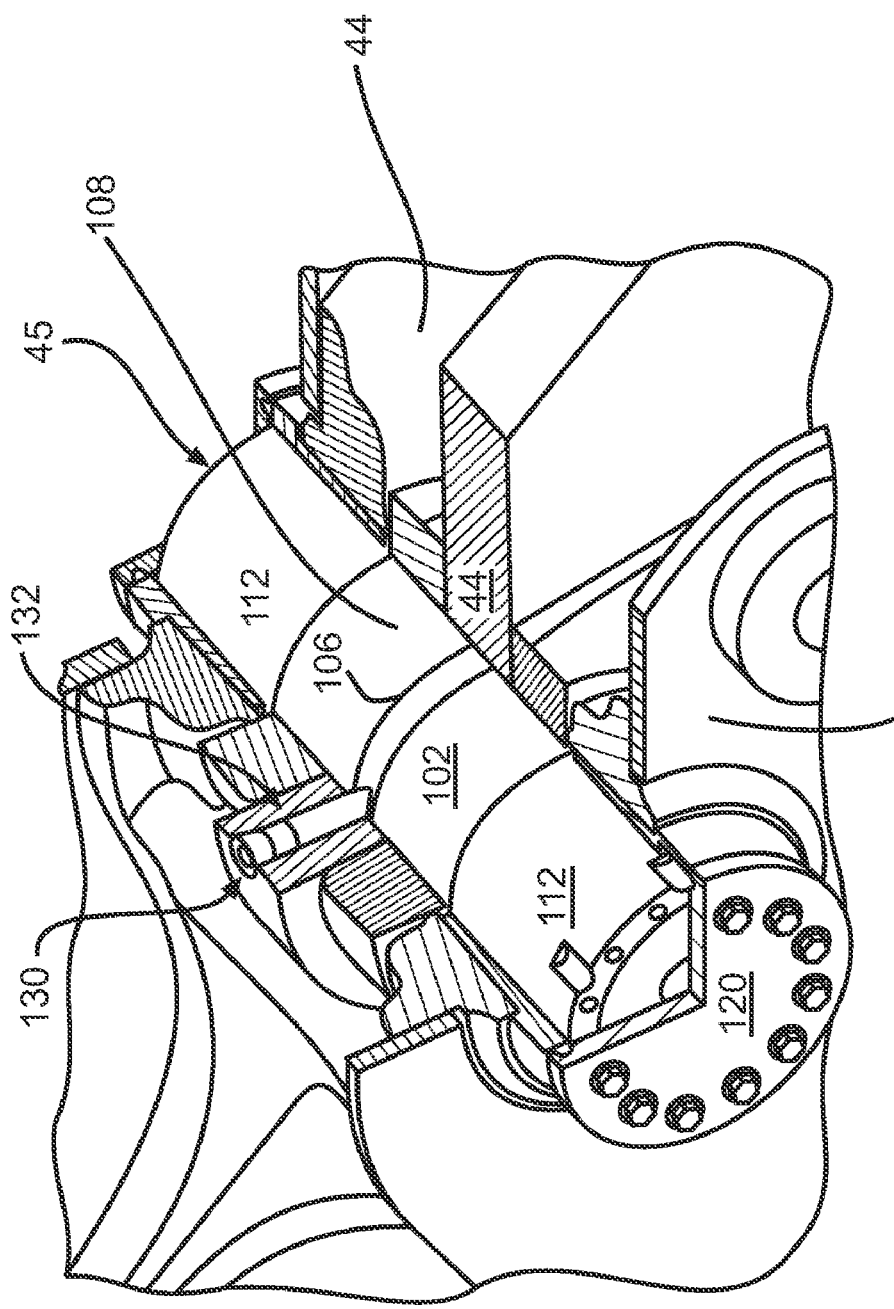
FIG. 4 is a perspective view of a cut away of the linkage of FIG. 1 showing the lateral pin retention system in engagement with the bushing of the pin joint.

Referring to FIG. 4, a perspective view of a cut away of the linkage of FIG. 1 showing the lateral pin retention system 130 in engagement with the bushing 102 of the pin joint 45. As shown, the arc groove 106 extends radially over the outer surface 108 of the bushing 102 and permits the linkage 44 to rotate relative to the bushing 102 while the lateral pin retention system 130 prevents lateral movement of the bushing relative to the linkage 44.

Figure 5:
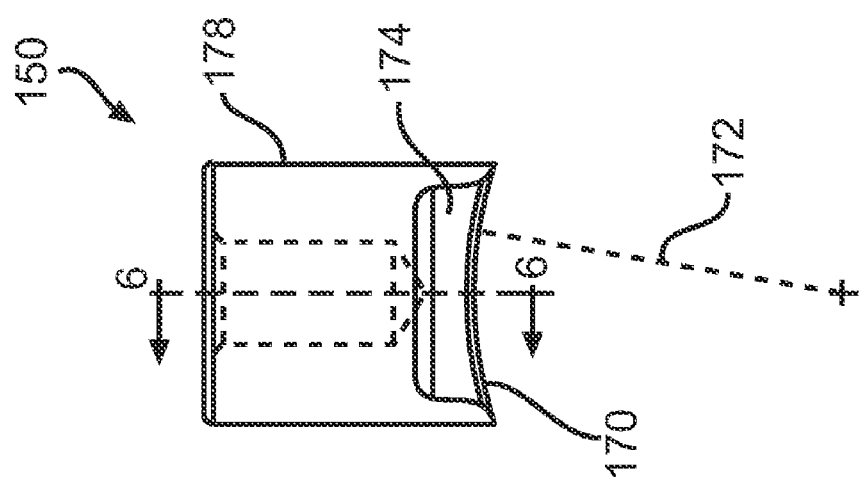
FIG. 5 is a side elevation view illustrating the engagement head in isolation.

Referring to FIG. 5, a side elevation view illustrates the engagement head 150 in isolation. The engagement head 150 may include a concave end 170 having a radius 172 similar to a radius of a bottom surface of the arc groove 106 to maximize engagement with the arc groove.

Figure 6:
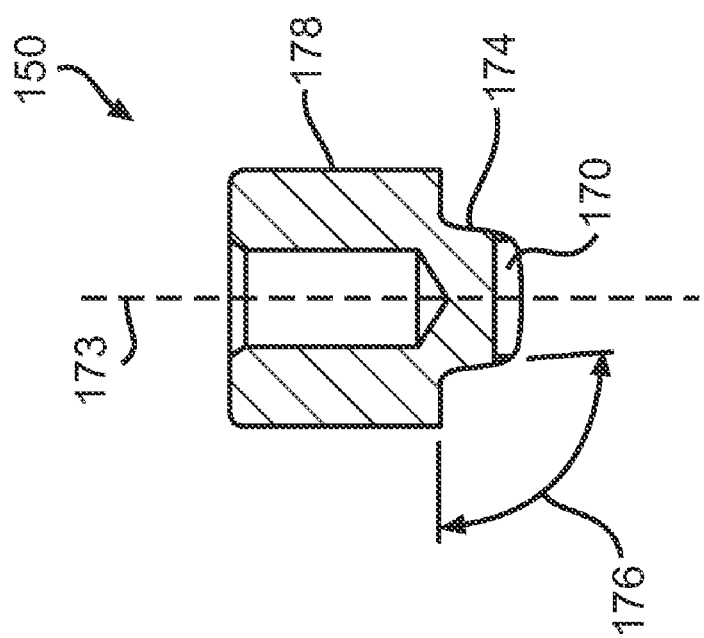
FIG. 6 is a cross section taken along line 6-6 of FIG. 5 and further illustrates engagement head.

Referring to FIG. 6, a cross section taken along line 6-6 of FIG. 5 further illustrates engagement head 150. As shown, the engagement head 150 may include a vertical axis 173 and side engagement surfaces 174 disposed at an angle 176 to the horizontal which is perpendicular to the vertical axis 173. Angle 176 facilitates maximum engagement between the side engagement surfaces 174 and the side surfaces of the arc groove 106. In some configurations, the angle 176 may range between about ninety-two and one hundred thirty-five degrees from horizontal. In other configurations, the angle 176 may range between ninety-five and one hundred degrees from horizontal.

As shown in FIGS. 5 and 6, the engagement head 150 has a substantially cylindrical profile 178 into which the side engagement surfaces 174 are formed.

INDUSTRIAL APPLICABILITY

In general, it is believed that the features of the lateral pin retention system disclosed herein provides improved position maintenance of a bushing of a pin joint while meeting the small packaging, weight and size requirements for modern linkages. When installed on a machine, the arc groove of the bushing and the retaining plug cooperate to maintain the position of the bushing on the pin. In other words, this system may be used to properly position the pin assembly within the joint during manufacture, repair, or replacement and provides positive pin retention during operation of the joint. In addition, for retrofit applications, an existing grease hole may be altered to accept the retaining plug and the existing pin joint replaced by a pin joint that includes an arc groove.

What is claimed is:

1. A pin joint comprising:
a pin having a longitudinal axis;
a bushing defining a through-hole extending along the longitudinal axis, the pin extending through the through-hole and being rotatably positioned therewith, the bushing including an arc groove disposed radially about an outer surface of the bushing; and
a retaining plug configured to be disposed in a linkage rotatably positioned around the bushing and including an engagement head engaging the arc groove to prevent lateral movement of the bushing relative to the pin when the engagement head engages the arc groove, wherein the retaining plug further includes a biasing member and a cap assembly, wherein the biasing member is configured to bias the engagement head away from the cap assembly towards the arc groove.

2. The pin joint of claim 1, wherein the engagement head includes a concave end having a radius about equal to the radius of a bottom surface of the arc groove.

3. The pin joint of claim 2, wherein the engagement head further includes side engagement surfaces disposed at an angle ranging between about ninety-two and one hundred thirty-five degrees from a horizontal axis that is perpendicular to a vertical axis of the retention plug.

4. The pin joint of claim 2, wherein the engagement head further includes side engagement surfaces disposed at an angle ranging between about ninety-five and one hundred degrees from a horizontal axis that is perpendicular to a vertical axis of the retention plug.

5. The pin joint of claim 1, further comprising:
a first collar disposed on a first side of the bushing, the first collar disposed on the pin;
a second collar disposed on a second side of the bushing, the second collar disposed on the pin;
a first seal disposed on the pin and between the first collar and the bushing; and
a second seal disposed on the pin and between the second collar and the bushing;
wherein the retaining plug maintains a position of the bushing between the first and second collars.

6. The pin joint of claim 1, wherein a portion of the engagement head that contacts the arc groove has a shape corresponding to a shape of the arc groove.

7. A pin joint system comprising:
a pin having a longitudinal axis;
a bushing defining a through-hole extending along the longitudinal axis, the pin extending through the through-hole and being rotatably positioned therewith, the bushing including a groove disposed radially about an outer surface of the bushing;
a linkage rotatably positioned around the bushing;
a retaining plug including a first portion fixed to the linkage and a second portion engaging the groove to prevent lateral movement of the bushing relative to the linkage when the linkage rotates relative to the bushing, wherein the retaining plug further includes a biasing member configured to bias the second portion away from the first portion toward the groove.

8. The system of claim 7, wherein the linkage includes a hole for receiving the retaining plug.

9. The system of claim 8, wherein the first portion of the retaining plug includes a cap assembly attached to the hole, and the second portion of the retaining plug includes an engagement head for engaging the groove.

10. The system of claim 7, wherein the second portion is movable relative to the first portion to engage the groove.

11. The system of claim 7, wherein the second portion includes a concave end having a radius about equal to the radius of a bottom surface of the groove.

12. The system of claim 7, wherein the second portion is shaped to ride within and engage the groove.

13. The system of claim 7, further comprising a lubricant refill plug disposed within the groove.

14. The system of 7, further comprising:
- a first collar disposed on the pin and on a first side of the bushing;
- a second collar disposed on the pin and on a second side of the bushing opposite the first side;
- a first seal disposed on the pin and between the first collar and the bushing; and
- a second seal disposed on the pin and between the second collar and the bushing.

15. A pin joint comprising:
- a pin having a longitudinal axis;
- a bushing defining a through-hole extending along the longitudinal axis, the pin extending through the through-hole and being rotatably positioned therewith, the bushing including a groove disposed radially about an outer surface of the bushing, the groove defining two side surfaces generally facing one another and a bottom surface;
- a retaining plug configured to be disposed in a linkage rotatably positioned around the bushing and including an engagement head engaging the groove, wherein the engagement head includes:
- two side engagement surfaces engaging respective two side surfaces of the groove when viewed in a plane parallel to the longitudinal axis, and
- a concave end engaging the bottom surface of the groove, the concave end having a curvature radius equal to the radius of the bottom surface when measured with respect to the longitudinal axis.

16. The pin joint of claim 15, further comprising a linkage rotatably positioned around the bushing, the linkage including a hole for receiving the retaining plug.

17. The pin joint of claim 16, wherein the retaining plug includes a cap assembly attached to the hole and the engagement head engaging the groove.

18. The pin joint of claim 17, wherein the engagement head is movable relative to the cap assembly.

* * * * *